(12) United States Patent
Parker et al.

(10) Patent No.: US 9,752,951 B2
(45) Date of Patent: **\*Sep. 5, 2017**

(54) BALLOON CATHETER APPARATUS FOR HIGH PRESSURE LEAK DETECTION

(71) Applicant: REDLINE DETECTION, LLC, Orange, CA (US)

(72) Inventors: Zachary Parker, Newport Coast, CA (US); Kenneth A. Pieroni, Yorba Linda, CA (US)

(73) Assignee: REDLINE DETECTION, LLC, Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,612

(22) Filed: Aug. 5, 2016

(65) Prior Publication Data

US 2016/0341625 A1    Nov. 24, 2016

Related U.S. Application Data

(63) Continuation of application No. 13/926,919, filed on Jun. 25, 2013, now Pat. No. 9,417,153.

(60) Provisional application No. 61/706,690, filed on Sep. 27, 2012.

(51) Int. Cl.
*G01M 3/02* (2006.01)
*G01M 3/20* (2006.01)

(52) U.S. Cl.
CPC .............. *G01M 3/022* (2013.01); *G01M 3/20* (2013.01)

(58) Field of Classification Search
CPC ........ B08B 9/0322; F16K 7/10; F16L 55/134; F16L 2101/30; F16L 2201/30; G01M 3/022; G01M 3/005; G01M 3/26; G01M 3/3263

See application file for complete search history.

(56) References Cited

U.S. PATENT DOCUMENTS

| | | | |
|---|---|---|---|
| 1,506,418 | A | 8/1924 | Evensta |
| 1,510,212 | A | 9/1924 | Du Bois |
| 1,710,439 | A | 9/1926 | Taylor |
| 2,192,155 | A | 4/1937 | Schuldt |
| 2,299,116 | A | 5/1941 | Svirsky |

(Continued)

FOREIGN PATENT DOCUMENTS

| | | |
|---|---|---|
| DE | 4411928 | 1/1995 |
| JP | S56110032 | 9/1981 |

(Continued)

OTHER PUBLICATIONS

Patent Cooperation Treaty International Search Report; PCT/US2013060732; Feb. 11, 2014; 5 pages.

(Continued)

*Primary Examiner* — David A Rogers
(74) *Attorney, Agent, or Firm* — Stetina Brunda Garred & Brucker

(57) ABSTRACT

An inflatable, balloon-type catheter apparatus which is conformable to fit most all intake and exhaust systems to delivery pressure (with or without smoke) to test the fluid integrity of the fluid system. The device is configured to be inserted into the canal of the intake or exhaust system and inflated to seal off the fluid system. The pressurized smoke is passed through the inflated inlet adapter to test for leaks.

20 Claims, 2 Drawing Sheets

(56) References Cited

U.S. PATENT DOCUMENTS

| | | |
|---|---|---|
| 2,273,984 A | 2/1942 | Osborn |
| 2,753,876 A | 3/1955 | Kurt |
| 2,764,243 A | 9/1956 | Page |
| 3,024,200 A | 3/1962 | Smith |
| 3,075,535 A | 1/1963 | Lasting |
| 3,234,357 A | 2/1966 | Seuthe |
| 3,431,945 A | 3/1969 | Robillard |
| 3,431,946 A | 3/1969 | Sawyer |
| 3,583,239 A | 6/1971 | Paine |
| 3,837,214 A | 9/1974 | Guest |
| 3,870,085 A | 3/1975 | Schneider |
| 4,352,515 A | 10/1982 | Schumacher |
| 4,354,515 A | 10/1982 | Sutherland |
| 4,373,381 A | 2/1983 | Kulp et al. |
| 4,373,767 A | 2/1983 | Cairns |
| 4,460,019 A | 7/1984 | Condon |
| 4,524,607 A | 6/1985 | Pelletier et al. |
| 4,550,751 A | 11/1985 | Shimamura |
| 4,608,858 A | 9/1986 | McKinnon |
| 4,750,525 A | 6/1988 | Vaughan |
| 4,764,660 A | 8/1988 | Swiatosz |
| 4,818,843 A | 4/1989 | Swiatosz |
| 4,905,931 A | 3/1990 | Covey |
| 5,022,435 A | 6/1991 | Jaw-Shiunn |
| 5,328,152 A | 7/1994 | Castle |
| 5,353,842 A | 10/1994 | Lundman |
| 5,390,738 A | 2/1995 | Eslinger et al. |
| 5,425,266 A | 6/1995 | Fournier |
| 5,501,115 A | 3/1996 | Kamiyama et al. |
| 5,647,054 A | 7/1997 | Jones |
| 5,735,955 A | 4/1998 | Monaghan et al. |
| 5,771,937 A | 6/1998 | Collins |
| 5,859,363 A | 1/1999 | Gouge |
| 5,922,944 A | 7/1999 | Pieroni et al. |
| 6,018,615 A | 1/2000 | Loblick |
| 6,053,210 A * | 4/2000 | Chapman ............ F16K 7/10 138/123 |
| 6,131,441 A | 10/2000 | Berube et al. |
| 6,142,009 A | 11/2000 | Loblick |
| 6,175,987 B1 | 1/2001 | Harvey |
| 6,267,001 B1 | 7/2001 | Duncan |
| 6,314,795 B1 | 11/2001 | Ingham |
| 6,336,482 B1 | 1/2002 | Cunkle et al. |
| 6,348,869 B1 | 2/2002 | Ashworth |
| 6,361,752 B1 | 3/2002 | Demarest et al. |
| 6,389,613 B1 | 5/2002 | Comas |
| 6,392,227 B1 | 5/2002 | Banyard et al. |
| 6,439,031 B1 | 8/2002 | Pieroni et al. |
| 6,502,603 B2 | 1/2003 | Lane, Jr. |
| 6,526,808 B1 | 3/2003 | Pieroni et al. |
| 6,651,486 B1 | 11/2003 | Johnson |
| 6,899,138 B2 | 5/2005 | Lundman |
| 6,907,771 B2 | 6/2005 | Finlay et al. |
| 7,305,176 B1 | 12/2007 | Pieroni et al. |
| 7,556,072 B2 * | 7/2009 | Koch, Jr. ............ B27L 7/00 144/193.2 |
| 2001/0035046 A1 | 11/2001 | Williams |
| 2002/0083989 A1* | 7/2002 | Lundman ............ F16L 55/134 138/91 |
| 2002/0152801 A1 | 10/2002 | Burke et al. |
| 2003/0047881 A1 | 3/2003 | Worm et al. |
| 2004/0144439 A1* | 7/2004 | Lundman ............ F16L 55/134 138/93 |
| 2004/0250867 A1* | 12/2004 | Janc ............ F16L 55/134 138/93 |
| 2007/0079649 A1 | 4/2007 | Nauseda et al. |
| 2007/0210525 A1* | 9/2007 | Saltel ............ F16L 55/134 277/332 |
| 2007/0261847 A1* | 11/2007 | Saltel ............ E21B 33/1277 166/287 |
| 2007/0297774 A1 | 12/2007 | Pieroni |
| 2009/0315326 A1 | 12/2009 | Pieroni |
| 2010/0095746 A1 | 4/2010 | Lund |
| 2010/0163254 A1* | 7/2010 | Saltel ............ F16L 55/134 166/387 |
| 2013/0247651 A1 | 9/2013 | Grange |
| 2013/0319540 A1 | 12/2013 | Hegner |
| 2014/0083168 A1 | 3/2014 | Parker et al. |

FOREIGN PATENT DOCUMENTS

| | | |
|---|---|---|
| JP | 59126223 | 7/1984 |
| JP | 59138935 | 8/1984 |
| JP | S59-138935 | 8/1984 |
| JP | 2003004581 | 1/2003 |

OTHER PUBLICATIONS

European Patent Office Extended Search Report; 13841836.1-1557/2901066; 3 pages.

Intake Pressure Testers for the Turbocharged Mitsubishi 3000GT/Dodge Stealth; http://www.stealth316.com/2-pressuretester.htm, Retrieved via Internet Archive. Dated Feb. 16, 2007.

DSM Boost Leaks/Turbo intake Pressure Tester; http://www.mirage-performance.com/EclipseGSX/BoostLeaks/index.html, Retrieved via Internet Archive. Dated Feb. 8, 2007.

* cited by examiner

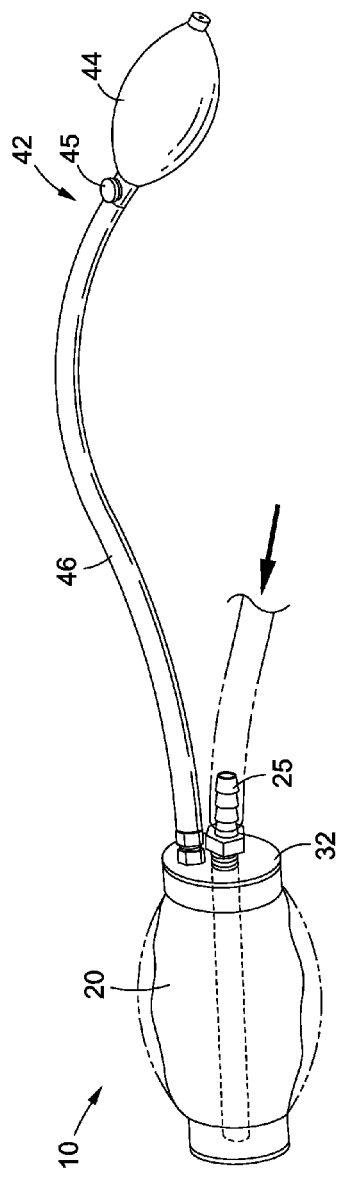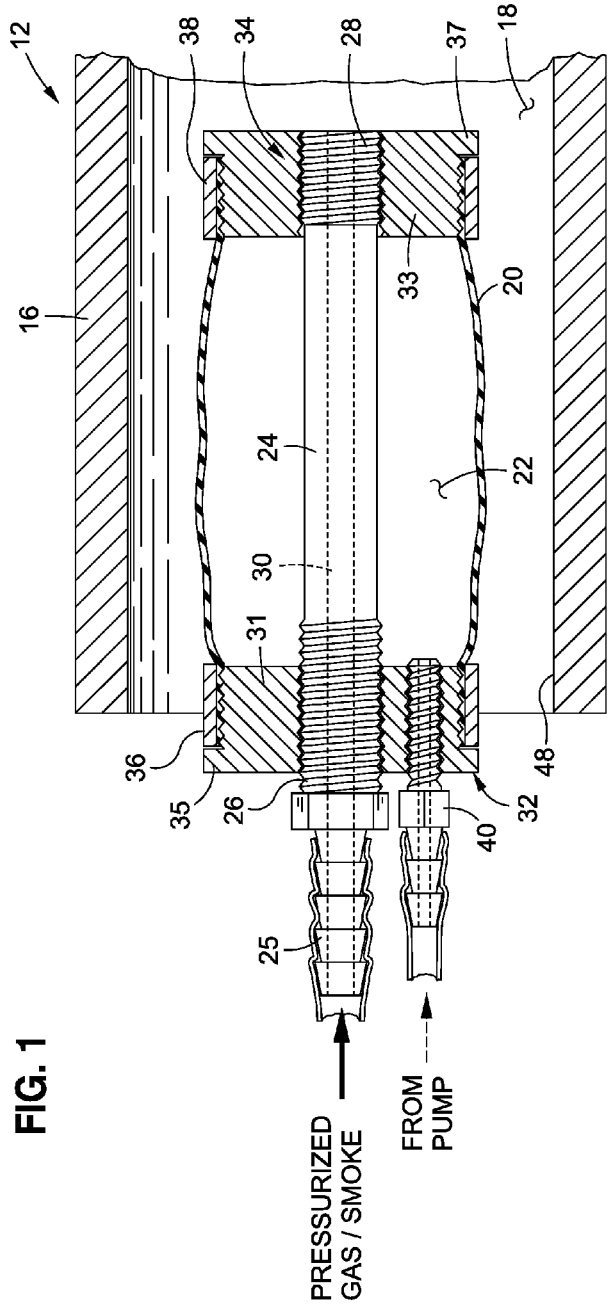

BALLOON CATHETER APPARATUS FOR HIGH PRESSURE LEAK DETECTION

CROSS-REFERENCE TO RELATED APPLICATIONS

This application is a continuation of prior U.S. application Ser. No. 13/926,919, filed Jun. 25, 2013, which claims the benefit of U.S. Provisional Application No. 61/706,690, filed Sep. 27, 2012, the contents of which are expressly incorporated herein by reference.

STATEMENT RE: FEDERALLY SPONSORED RESEARCH/DEVELOPMENT

Not Applicable

BACKGROUND

1. Technical Field

The present disclosure generally relates to an inlet adapter for use with a fluid testing device, and more specifically, to an inflatable universal inlet adapter configured to form a fluid tight seal with the fluid system under test when the inlet adapter is inflated.

2. Related Art

There are many useful systems which contain and/or operate using a fluid (gas, liquid or combination of both). For example, automobiles have several systems which contain and utilize a fluid in their operation including the fuel system, the exhaust system, the heating, cooling and ventilation (HVAC) system, and the hydraulic power steering and brake systems, to name a few. Moreover, numerous industrial machines, household HVAC systems, and other devices utilize a fluid to operate. Such fluids include, for example, gases such as air or evaporated system liquid, fuel, hydraulic fluids, manufactured gases and liquids, and many other fluids.

In almost all circumstances, it is important, and in many cases crucial, that these fluid systems be properly sealed to prevent leakage of the system fluid. As an example, in an automobile fuel system, the gas tank and gas lines must be thoroughly sealed to prevent gasoline fumes from polluting the air and also to prevent leaking fuel from creating a fire hazard, not to mention the obvious benefit of conserving gasoline. In HVAC systems, it is important to seal the ducting which transports the conditioned air in order to maintain the efficiency of the systems. Air leaks tend to do nothing but heat or cool an attic, wall interior or other undesired space.

In many cases, leaks in fluid systems are very difficult to detect and/or locate because the leak is small or in a location not easily accessible. Accordingly, a variety of methods and devices have been devised to detect leaks in fluid systems. The most common leak detectors utilize a visual indicator to locate a leak so that the leak may be repaired. Some of the visual indicators include liquid dyes. The visual indicator is dispensed into the fluid system and leaks are detected by locating places on the system where the visual indicator has escaped the system. For instance, a liquid dye will leave a trace of dye at the leak and smoke will billow out through the leak. Liquid dyes tend to be most useful for detecting leaks in fluid systems which utilize a liquid and are not so useful for gas systems or systems which must seal vapors created by the system fluid. Nevertheless, liquid leaks are typically easier to detect than gas and vapor leaks because the liquid itself is usually visible.

Vaporized dyes and smoke are generally most useful for detecting leaks in gas systems and systems which have vapors. In some cases, vaporized dye may be added to the smoke such that a trace of dye is left at the leak as the smoke flows through the leak. In general, devices for producing smoke for leak detection comprise a sealed chamber in which smoke is generated by vaporizing a smoke-producing fluid using a heating element. The smoke within the sealed chamber is forced out of the chamber through an outlet port by air pressure from a source of compressed air pumped into the sealed chamber.

Critical to most any fluid detection system is an inlet adapter which is able to contain the test fluid/vapor at the inlet end. Historically, intake systems and exhaust systems could be effectively tested using EVAP smoke machines that produce smoke at relatively small pressures. Because of the low pressure, smoke could be inserted into the intake/exhaust system via an adapter cone inserted by hand. Leaks in naturally aspirated engines were routinely detected via this method very effectively.

However, boosted engines (with turbochargers or superchargers) have leaks that are typically present under load where the boost can be 10 PSI to 15 PSI, or in some cases over 20 PSI. These types of tiny leaks only make themselves known at high pressures (e.g., 10-20 PSI or higher).

In view of these high pressure requirements, high pressure diagnostic leak detectors have been developed which produce smoke at elevated pressures for testing the fluid integrity of the fluid system. Inlet adapters are typically used with these high pressure diagnostic leak detectors; however, the inlet adapters are typically customized for use with a fluid system having conduits which are of a specific size and configuration.

Accordingly, there is a need in the art for a universal inlet adapter configured to deliver pressurized smoke into most all fluid systems. The present invention addresses this need, as will be discussed in more detail below.

BRIEF SUMMARY

According to an aspect of the invention, there is provided a balloon-type catheter apparatus which is conformable to fit most all intake and exhaust systems to deliver pressure (with or without smoke) to test the fluid integrity of the fluid system. The device is configured to be inserted into the canal of the intake or exhaust system and inflated to seal off the fluid system. The pressurized smoke is passed through the inflated inlet adapter to test for leaks.

One embodiment of the present invention includes a universal inlet adapter for a leak detection device using a pressurized detection media for detecting a leak in a fluid system having a fluid duct. The universal inlet adapter comprises an inflatable bladder selectively transitional between an inflated configuration and a deflated configuration. The inflatable bladder is configured to be engagable with the fluid duct to form a fluid tight seal therebetween as the inflatable bladder transitions from the deflated configuration to the inflated configuration. The universal inlet adapter further includes a test fluid delivery tube extending through the inflatable bladder such that the inflatable bladder is disposed radially outward from the test fluid delivery tube. The test fluid delivery tube is fluidly connectable with the leak detection device for delivering the pressurized detection media into the fluid duct for testing.

The inflatable bladder may define an internal bladder reservoir, and the test fluid delivery tube may traverse through the internal bladder reservoir. The inflatable bladder may be conformable to the shape of the fluid duct as the inflatable bladder transitions from the deflated configuration to the inflated configuration. The inflatable bladder may define a tubular configuration.

The test fluid delivery tube may be co-axially aligned with the bladder. The test fluid delivery tube is an elongate rigid tube. The test fluid delivery tube may define an internal passageway fluidly isolated from the internal bladder reservoir.

The universal inlet adapter may additionally include an inflation conduit fluidly connected to the inflatable bladder and fluidly connectable to a pressurized fluid source for selectively transitioning the inflatable bladder from the deflated configuration to the inflated configuration. A hand pump may be fluidly coupled or connectable to the inflation conduit for delivering fluid into the inflatable bladder for causing the inflatable bladder to transition from the deflated configuration to the inflated configuration.

The universal inlet adapter may additionally include a pair of rigid end caps connected to the inflatable bladder at opposed end portions of the inflatable bladder. A pair of locking rings may cooperate with respective ones of the pair of rigid end caps to secure the bladder therebetween. The pair of rigid end caps may include a first rigid end cap and a second rigid end cap, wherein the first rigid end cap is connected to the test fluid delivery tube and the inflation conduit, and the second rigid end cap is connected to the test fluid delivery tube. The pair of rigid end caps and the test fluid delivery tube may be threadedly engageable.

According to another embodiment, there is provided a method of testing the fluid integrity of a fluid system having a fluid duct. The method includes providing a leak detection device including an inflatable bladder selectively transitional between an inflated configuration and a deflated configuration, wherein the inflatable bladder is configured to be engagable with the fluid duct to form a fluid tight seal therebetween as the inflatable bladder transitions from the deflated configuration to the inflated configuration, and a test fluid delivery tube extending through the inflatable bladder such that the inflatable bladder is disposed radially outward from the test fluid delivery tube. The method additionally includes inserting the leak detection device into the fluid duct and inflating the inflatable bladder to create a fluid tight seal between the inflatable bladder and the fluid duct. The method further includes directing a test media into the fluid system via the test fluid delivery tube.

The inserting step may include inserting the leak detection device into the fluid duct such that a majority of the bladder is inserted into the fluid duct.

The inflating step may include using a hand pump to inflate the inflatable bladder. The inflating step may include inflating the bladder to a pressure greater than the pressure of the test media. The inflating step and the directing steps may result in the creation of a pressure differential within the fluid duct on opposed sides of the bladder.

The method may additionally include the step of fluidly connecting the test fluid delivery tube to the test media. The method may further comprise the steps of deflating the bladder from the inflated position to the deflated position to break the fluid-tight seal between the bladder, and removing the leak detection device from the fluid duct.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 1 is an upper perspective view of a universal inlet adapter configured for use with a pressurized test media for testing the fluid integrity of a fluid system;

FIG. 2 is a side sectional view of the universal inlet adapter in a deflated configuration and inserted within a fluid duct of the fluid system.

Common reference numerals are used throughout the drawings and the detailed description to indicate the same elements.

DETAILED DESCRIPTION

Figure 3:
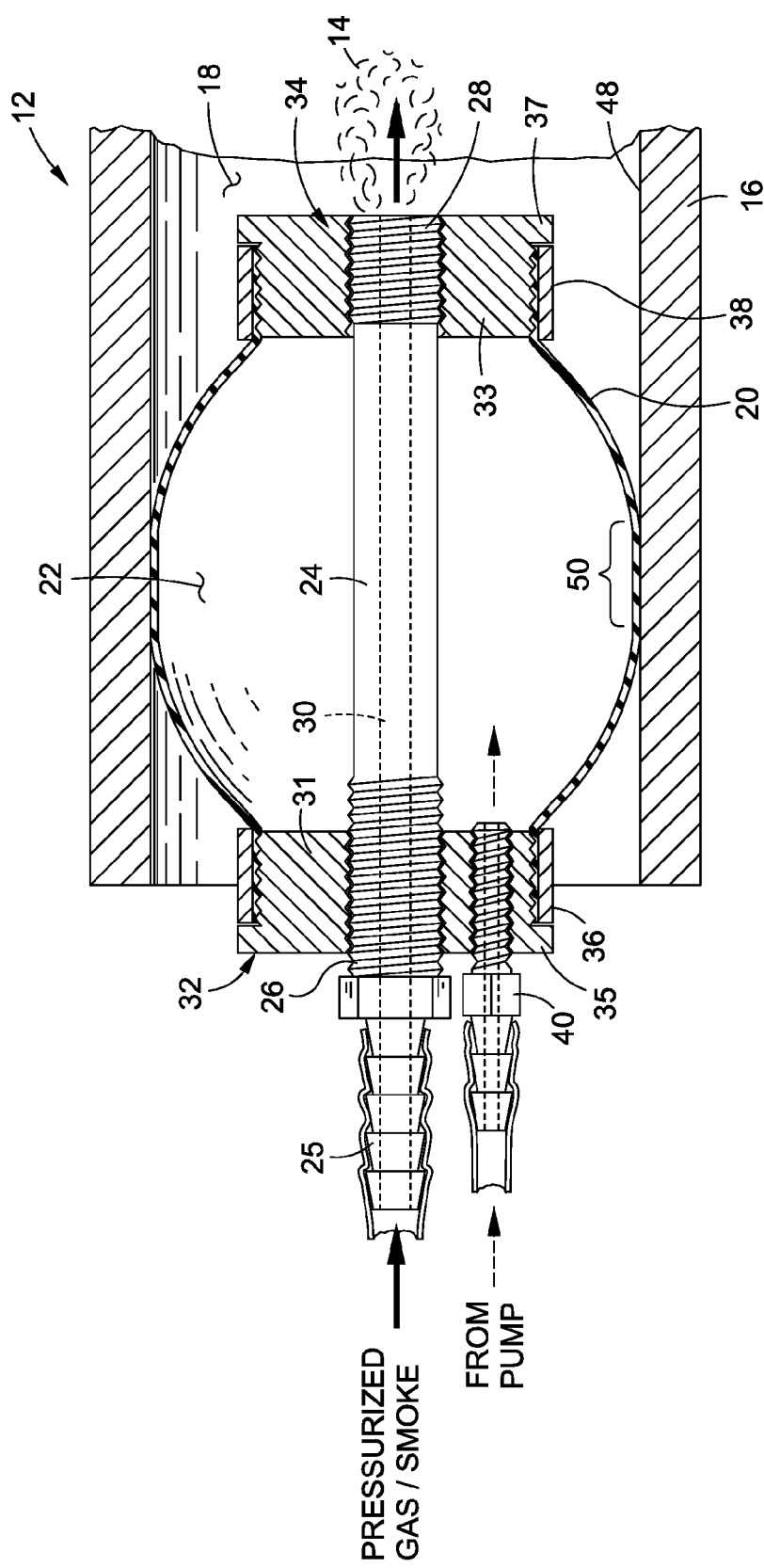
FIG. 3 is a side sectional view of the universal inlet adapter depicted in FIG. 2, with the universal inlet adapter depicted in the inflated configuration.

The detailed description set forth below in connection with the appended drawings is intended as a description of the presently preferred embodiments of the invention, and is not intended to represent the only form in which the present devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Referring now to the drawings, wherein the showings are for purposes of illustrating a preferred embodiment of the present invention only, and are not for purposes of limiting the same, there is depicted a universal and inflatable inlet adapter 10 for use with a fluid leak detector. The inlet adapter 10 is configured to assume a deflated configuration to define a small profile to facilitate insertion of the inlet adapter 10 into a fluid system 12 for testing. Once inserted, the inlet adapter 10 is selectively transitional from the deflated configuration to an inflated configuration, wherein the inlet adapter 10 expands so as to create a fluid-tight seal between the inlet adapter 10 and the fluid system 12. The inlet adapter 10 is further configured to deliver test media 14 (e.g., smoke) into the fluid system 12 for identifying potential leaks within the system 12.

The inflatable inlet adapter 10 is configured to be conformable to the unique size and configuration of a fluid duct 16 (e.g., intake or exhaust) of the fluid system 12 being tested. In this regard, the degree to which the inlet adapter 10 is inflated typically depends directly on the size of the opening 18 defined by the fluid duct 16. The inlet adapter 10 will generally be inflated to a lesser degree for smaller fluid ducts 16, and to a greater degree for larger fluid ducts 16. Furthermore, the inflatable portion of the inlet adapter 10 will generally conform to the specific shape of the duct opening 18 to create a strong, fluid-tight seal between the fluid duct 18 and the inlet adapter 10.

The inlet adapter 10 includes an inflatable bladder 20 selectively transitional between the inflated configuration and the deflated configuration. The inflatable bladder 20 defines an internal bladder reservoir 22 which expands as the bladder 20 transitions from the deflated configuration toward the inflated configuration. The inflatable bladder 20 is preferably formed from an expandable, resilient and durable material capable of being inserted within fluid systems for testing. Along these lines, the material used to form the bladder 20 should have a sufficient thickness which provides strength and durability to the bladder 20 so as to mitigate inadvertent rupturing of the bladder 20, while at the same time allowing the bladder 20 to be flexible enough so as to generally conform to the unique shape of the fluid duct 16 as the bladder 20 transitions to the inflated configuration.

The exemplary bladder 20 depicted in the Figures is formed from a generally cylindrical sleeve having an opening extending through the sleeve. The bladder 20 preferably engages with a pair of rigid end caps 32, 34 at opposed ends of the bladder 20, as will be described in more detail below.

The universal inlet adapter 10 further includes a test fluid delivery tube 24 extending through the inflatable bladder 20 for delivering the pressurized detection media 14 (e.g., smoke) into the fluid duct 16 for testing. The test fluid delivery tube 24 includes a first end portion 26 connectable to the leak detection device to receive a pressurized testing media 14 therefrom, and an opposing second end portion 28 configured to deliver the pressurized test media 14 into the fluid duct 16 for testing. The test fluid delivery tube 24 defines an internal passageway fluidly 30 isolated from the internal bladder reservoir 22 and extending between the first and second end portions 26, 28.

According to one embodiment the test fluid delivery tube 24 is an elongate rigid tube extending through the bladder reservoir 24, and co-axially aligned with the bladder 20 such that the inflatable bladder 20 is disposed radially outward from the test fluid delivery tube 24. The test fluid delivery tube 24 may include a nipple or fluid connector 25 disposed adjacent the first end portion 26 and being fluidly connectable with the testing device for receiving the testing media 14 therefrom.

The universal inlet adapter 10 may additionally include a pair of rigid end caps 32, 34 connected to the inflatable bladder 20 at opposed end portions of the inflatable bladder 20. A first rigid end cap 32 is connected to the test fluid delivery tube 24 adjacent the first end portion 26 thereof and a second rigid end cap 34 is connected to the test fluid delivery tube 24 adjacent the second end portion 28 thereof. The end caps 32, 34 include respective insertion portions 31, 33 insertable into the bladder opening at respective ends of the bladder 20. Flange portions 35, 37 extend radially outward from respective insertion portions 31, 33 and preferably define a perimeter or diameter that is larger than the perimeter/diameter of the bladder 20 at the end portions.

In the exemplary embodiment, the test fluid delivery tube 24 is externally threaded at the first and second end portions 26, 28, while the first and second end caps 32, 34 include apertures which are internally threaded. The external threads on the test fluid delivery tube 24 engage with the internal threads formed on the rigid end caps 32, 34 to connect the end caps 32, 34 to the test fluid delivery tube 24. As can be seen in FIGS. 2 and 3, the first end portion 26 includes a region of external threads that extends axially along test fluid delivery tube 24 that is greater than the axial distance which the first end cap 32 extends along the test fluid delivery tube 24. In other words, the external threads extend on either side of the first end cap 32 from the position shown in FIGS. 2 and 3. As would be apparent to those skilled in the art, the first end cap 32 may translate axially relative to the test fluid delivery tube 24 by virtue of the threads formed on the test fluid delivery tube 24. The threaded engagement between the test fluid delivery tube 24 and the rigid end caps 32, 34 preferably forms a fluid-tight seal between the test fluid delivery tube 24 and the rigid end caps 32, 24 to allow the bladder 20 to be inflated without fluid leaking through the interface between the delivery tube 24 and the end caps 32, 34. It is contemplated that a sealant may be used to strengthen the fluid-tight engagement between the delivery tube 24 and the end caps 32, 34.

A pair of locking rings 36, 38 may be used to connect the inflatable bladder 20 to the end caps 32, 34. Each locking ring 36, 38 cooperates with one of the pair of rigid end caps 32, 34 to secure the inflatable bladder 20 between the locking rings 32, 34 and the end caps 36, 38. The locking rings 36, 38 fit over respective insertion portions 31, 33 of the end caps 32, 34 and may be positioned adjacent to or in abutting relation with the respective flange portion 35, 37 of the end caps 32, 34. The locking rings 36, 38 may define an outer diameter that is flush with the outer diameter of the corresponding flange portion 35, 37. Furthermore, the locking rings 36, 38 may include smooth inner diameters which force contact at the tips of the barbs formed on the outer diameter of insertion portions 31, 33 to create an air tight seal. As the bladder 20 inflates, the expanding bladder 20 forces and holds the rings 36, 38 in place The engagement of the end caps 32, 34 to the delivery tube 24 preferably fixes the axial length of the inlet adapter 10, such that when the bladder 20 is inflated, the bladder 20 expands radially outward, rather than expanding in an axial dimension.

The universal inlet adapter 10 may additionally include an inflation conduit 40 fluidly connected to the inflatable bladder 20 and fluidly connectable to a pressurized fluid source for selectively transitioning the inflatable bladder 20 from the deflated configuration to the inflated configuration. The inflation conduit 40 extends through the first end cap 32 to deliver pressurized fluid from the fluid source into the bladder 20.

A hand pump 42 may be fluidly coupled or connectable to the inflation conduit 40 for inflating the bladder 20. In the exemplary embodiment, the hand pump 42 includes a pumping mechanism 44 and a pump conduit 46 for delivering pressurized fluid (e.g., air) into the bladder reservoir 22. The hand pump 42 may also include a release valve 45 for releasing fluid from the bladder 20 during deflation thereof. Although the exemplary embodiment includes a hand pump 42 for inflating the bladder 20, those skilled in the art will appreciate that an electrical pump may also be used for inflating the bladder 20.

Although the exemplary embodiment includes rigid end caps 32, 34, it is contemplated that other embodiments of the inlet adapter 10 may not include rigid end caps 32, 34. In this regard, the bladder 20 may be coupled directly to the delivery tube 24, and may include an inflation port integrated into the bladder 20 for inflation. Furthermore, it is also contemplated that other embodiments may include a hybrid design wherein a single rigid end cap is used at one end of the bladder 20, while the opposing end of the bladder 20 is formed without an end cap.

With the basic structural features of the inlet adapter 10 described above, the following discussion focuses on use of the inlet adapter 10 for testing the fluid integrity of the fluid system 12. With the bladder 20 in the deflated configuration, the inlet adapter 10 is inserted into the duct opening 18 such that a majority of the bladder 20 is inserted into the fluid duct 16. In this regard, a sufficient amount of the bladder 20 is inserted into the duct 16 so as to allow the bladder 20 to create a fluid tight seal between the bladder 20 and the inner surface 48 of the duct 16.

The inflatable bladder 20 is then inflated to create a fluid tight seal between the inflatable bladder 20 and the inner surface 48 of the fluid duct 16. As can be seen in FIG. 3, when the inflatable bladder 20 is inflated and begins to interface with the inner surface 48 of the fluid duct 16, the bladder 20 begins to conform to, or assume the shape of the inner surface 48 of the bladder 20. In particular, the pressure within the bladder 20 shown in FIG. 3 has caused the bladder 20 to engage with the inner surface 48 and to define a flattened region 50 that has assumed the shape of the inner surface 48.

As noted above, inflation of the bladder 20 may be achieved through the use of a hand pump 42, or an electrical pump, or via other inflation means known by those skilled in the art. Preferably, the bladder 20 is inflated to an internal pressure which is greater than the testing pressure so as to anchor the bladder 20 firmly within the fluid duct 16 during testing.

The method further includes directing the pressurized test media 14 into the fluid system 12 via the test fluid delivery tube 24. The pressurized test media 14 may be directed into the fluid system 12 by connecting the test fluid delivery tube 24 to testing device.

When the bladder 20 is inflated and the pressurized media 14 is directed into the fluid system 12, a pressure differential may be created within the fluid duct 16 on opposed sides of the bladder 20. In particular, the pressure within the fluid duct 16 on the downstream side of the bladder 20 (e.g., the side to which the pressurized media 14 is emitted) is greater than the pressure within the fluid duct 16 on the opposed side of the bladder 20. The fluid-tight seal between the bladder 20 and the duct 16 allows the creation of the pressure differential for conducting the fluid integrity testing.

It is contemplated that the fluid integrity testing may be conducted at various pressures, preferably in the range of 0.5-20 PSI, although those skilled in the art will recognize that tests performed at pressures outside of exemplary pressure range may also be conducted without departing from the spirit and scope of the present invention. Elevated testing pressures (i.e., 10-20 PSI) are preferable for boosted engines (with turbochargers or superchargers), wherein the leaks may only be detectable at such high pressures.

Once the testing is complete, the bladder 20 may be transitioned from the inflated position to the deflated position to break the fluid-tight seal between the bladder 20 and the fluid duct 16, and to facilitate removal of the inlet adapter 10 from the fluid duct 16.

The particulars shown herein are by way of example and for purposes of illustrative discussion of the embodiments of the present invention only and are presented in the cause of providing what is believed to be the most useful and readily understood description of the principles and conceptual aspects. In this regard, no attempt is made to show more details than is necessary for a fundamental understanding of the disclosure, the description taken with the drawings making apparent to those skilled in the art how the several forms of the presently disclosed invention may be embodied in practice.

What is claimed is:

1. A universal inlet adapter for a leak detection device using a pressurized detection media for detecting a leak in a fluid system having a fluid duct, the universal inlet adapter comprising:
   a pair of rigid end caps;
   an inflatable bladder engageable with the pair of rigid end caps and being selectively transitional between an inflated configuration and a deflated configuration, the inflatable bladder being configured to be engagable with the fluid duct to form a fluid tight seal therebetween as the inflatable bladder transitions from the deflated configuration to the inflated configuration; and
   a test fluid delivery tube extending through the inflatable bladder and being fluidly connectable with the leak detection device for delivering the pressurized detection media into the fluid duct for testing;
   the test fluid delivery tube having a first threaded surface that mates to a second threaded surface of one of the pair of rigid end caps, the first threaded surface and the second threaded surface being configured to enable translatable movement of the at least one of the pair of end caps relative to the test fluid delivery tube so that the distance between the first rigid end cap and the second rigid end cap is adjustable to adjust a configuration of the inflatable bladder.

2. The universal inlet adapter recited in claim 1, wherein the inflatable bladder defines an internal bladder reservoir, the test fluid delivery tube traversing through the internal bladder reservoir.

3. The universal inlet adapter recited in claim 1, wherein the inflatable bladder is conformable to the shape of the fluid duct as the inflatable bladder transitions from the deflated configuration to the inflated configuration.

4. The universal inlet adapter recited in claim 1, wherein the inflatable bladder defines a tubular configuration.

5. The universal inlet adapter recited in claim 4, wherein the test fluid delivery tube is co-axially aligned with the bladder.

6. The universal inlet adapter recited in claim 1, wherein the test fluid delivery tube is an elongate rigid tube.

7. The universal inlet adapter recited in claim 1, further comprising an inflation conduit fluidly connected to the inflatable bladder and fluidly connectable to a pressurized fluid source for selectively transitioning the inflatable bladder from the deflated configuration to the inflated configuration.

8. The universal inlet adapter recited in claim 7, wherein the pair of rigid end caps include a first rigid end cap and a second rigid end cap, the first rigid end cap being connected to the test fluid delivery tube and the inflation conduit, the second rigid end cap being connected to the test fluid delivery tube.

9. The universal inlet adapter recited in claim 7, further comprising a hand pump fluidly coupled to the inflation conduit for delivering fluid into the inflatable bladder for causing the inflatable bladder to transition from the deflated configuration to the inflated configuration.

10. The universal inlet adapter recited in claim 1, further comprising a pair of locking rings configured to cooperate with respective ones of the pair of rigid end caps to secure the bladder therebetween.

11. The universal inlet adapter recited in claim 1, wherein the test fluid delivery tube defines an internal passageway fluidly isolated from the internal bladder reservoir.

12. The universal inlet adapter recited in claim 1, wherein each rigid end cap extends between the test fluid delivery tube and the inflatable bladder so that the inflatable bladder does not contact the test fluid delivery tube.

13. A universal inlet adapter for a leak detection device using a pressurized detection media for detecting a leak in a fluid system having a fluid duct, the universal inlet adapter comprising:
   a pair of rigid end caps;
   an inflatable bladder engageable with the pair of rigid end caps and being selectively transitional between an inflated configuration and a deflated configuration, the inflatable bladder being configured to be engagable with the fluid duct as the inflatable bladder transitions from the deflated configuration to the inflated configuration; and a test fluid delivery tube extending through the inflatable bladder and being fluidly connectable with the leak detection device;

the test fluid delivery tube and one of the pair of rigid end caps being configured to enable translatable movement of the at least one of the pair of end caps relative to the test fluid delivery tube so that the distance between the first rigid end cap and the second rigid end cap is adjustable to adjust a configuration of the inflatable bladder.

14. A method of testing the fluid integrity of a fluid system having a fluid duct, the method comprising the steps of:

inserting a leak detection device into the fluid duct, the leak detection device comprising:

a pair of rigid end caps;

an inflatable bladder having opposed ends and being selectively transitional between an inflated configuration and a deflated configuration, the inflatable bladder being configured to be engagable with the fluid duct to form a fluid tight seal therebetween as the inflatable bladder transitions from the deflated configuration to the inflated configuration; and a test fluid delivery tube extending through the inflatable bladder, the test fluid delivery tube having a first threaded surface that mates to a second threaded surface of one of the pair of rigid end caps, the first threaded surface extending along a length greater than that of the second threaded surface to enable translatable movement of the at least one of the pair of end caps relative to the test fluid delivery tube so that the distance between the first rigid end cap and the second rigid end cap is adjustable to adjust a configuration of the inflatable bladder;

inflating the inflatable bladder to create a fluid tight seal between the inflatable bladder and the fluid duct; and directing a test media into the fluid system via the test fluid delivery tube.

15. The method recited in claim 14, wherein the inserting step includes inserting the leak detection device into the fluid duct such that a majority of the bladder is inserted into the fluid duct.

16. The method recited in claim 14, wherein the inflating step includes using a hand pump to inflate the inflatable bladder.

17. The method recited in claim 14, wherein the inflating step includes inflating the bladder to a pressure greater than the pressure of the test media.

18. The method recited in claim 14, further comprising the step of fluidly connecting the test fluid delivery tube to the test media.

19. The method recited in claim 14, wherein the inflating step and the directing steps result in the creation of a pressure differential within the fluid duct on opposed sides of the bladder.

20. The method recited in claim 14, further comprising the steps of:

deflating the bladder from the inflated position to the deflated position to break the fluid-tight seal between the bladder; and removing the leak detection device from the fluid duct.

* * * * *